C. W. WALLER.
SIGNALING DEVICE.
APPLICATION FILED FEB. 15, 1913.
1,126,320.
Patented Jan. 26, 1915.
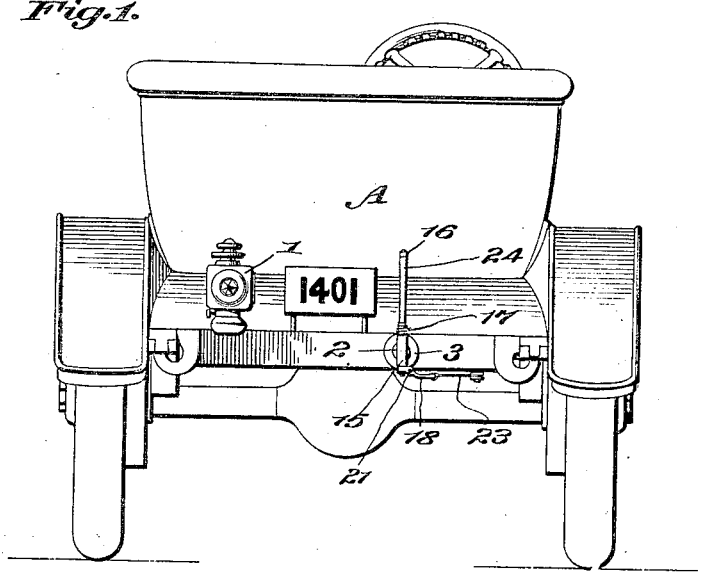
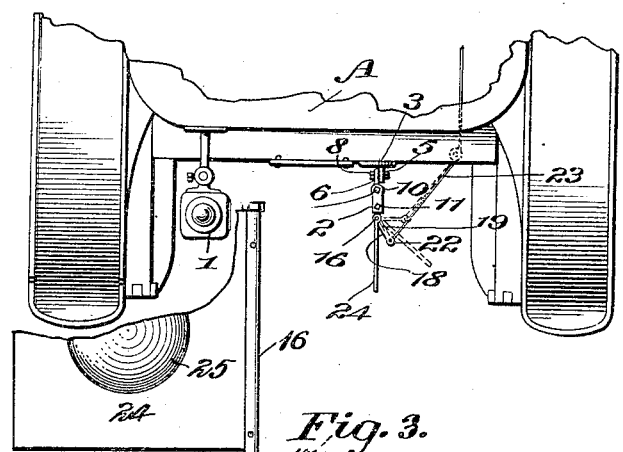
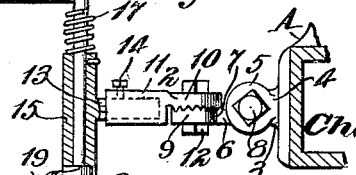
Witnesses
G. C. Hennesy
John J. McCarthy
Inventor
Charles W. Waller,
By Victor J. Evans,
Attorney

UNITED STATES PATENT OFFICE.

CHARLES W. WALLER, OF CHICAGO, ILLINOIS, ASSIGNOR OF ONE-HALF TO PETER A. FRANZMANN, OF CHICAGO, ILLINOIS.

SIGNALING DEVICE.

1,126,320.  Specification of Letters Patent.  Patented Jan. 26, 1915.

Application filed February 15, 1913. Serial No. 748,627.

*To all whom it may concern:*

Be it known that I, CHARLES W. WALLER, a citizen of the United States, residing at Chicago, in the county of Cook and State of Illinois, have invented new and useful Improvements in Signaling Devices, of which the following is a specification.

This invention relates to improvements in signaling devices and has particular application to a signal apparatus for use on automobiles and other motor-driven or self-propelled vehicles.

In carrying out the present invention, it it my purpose to provide a signaling device by means of which the operator of the vehicle equipped with my invention may convey signals indicative of the manner in which he is to operate his machine, to operators of machines in the vicinity thereof.

It is also my purpose to provide a signaling device which will embody, among other features in its construction, a source of light and a signal blade or plate adapted to be swung into and out of the path of the rays from the source of light so that the signal device may be rendered operative and inoperative.

Furthermore, I aim to provide a signal apparatus which will embrace the desired features of simplicity, efficiency, durability and convenience, coupled with cheapness of cost in manufacture and installation and which, when once installed, may be readily manipulated.

With the above-recited and other objects of a similar nature in view, the invention consists in the construction, combination and arrangement of parts set forth in and falling within the scope of the appended claim.

In the accompanying drawings: Figure 1 is a rear elevation of an automobile equipped with my present invention. Fig. 2 is a fragmentary top plan view of the same. Fig. 3 is a fragmentary side elevation thereof.

Referring now to the accompanying drawings in detail, and particularly to the form of my invention shown in Figs. 1, 2 and 3, A indicates the back or rear of an automobile or other motor vehicle, while the numeral 1 designates the usual tail lamp of the machine appropriately fastened to the back adjacent to one of the lower corners thereof. Extending outwardly from the back A of the machine is a horizontally disposed bracket 2 which, in the present instance, is capable of adjustment and composed of a base 3 from which projects an arm 4 terminating in a toothed lug 5 formed with an aperture alining with a second aperture in a toothed lug 6 formed on one end of a connector 7, the teeth of the lugs 5 and 6 being adapted to be interlocked with each other and held in such interlocking engagement by means of a bolt or other device 8 passed through the registering apertures in the said lugs. The opposite end of the connector 7 is formed to provide a toothed lug 9 disposed in a plane at right angles to that of the lugs 5 and 6 and having the teeth thereof designed to interlock with the teeth on the lug 10 formed on one end of a sleeve 11, said lugs 9 and 10 being provided with registering openings to receive a bolt 12. A rod 13 has one end thereof slidably disposed within the sleeve 11 and is adapted to be held in any desired adjusted position within the sleeve by means of a set screw 14, passed through the sleeve and designed to bind against the adjacent portion of the rod, while the outer end of the rod is formed to provide a vertically disposed bearing 15 in which is mounted for rotary movement an upwardly extending shaft 16 encircled by a coiled spring 17 having one end thereof suitably connected to the bearing and the opposite end, fastened to the shaft. The lower end of the shaft 16 extends below the bearing or journal 15 and has connected thereto an arm 18 disposed in a plane at right angles to that of the shaft and formed in the present instance of a metallic strip split longitudinally for the major portion of its length as at 19 to provide clamping arms each terminating in a semi-circular finger 20 coöperating with the other finger to grip the adjacent end of the shaft, a binding screw 21 being passed through alining apertures in the arms to produce an effective clamping action. The free end of the arm 18 is formed with an aperture 22 in which is connected one end of a cord 23 or other flexible element extending along the machine and connected to one of the control levers thereof as, for instance, the brake lever. It will be understood, however, that the free end of the cord or cable 23 may be connected to a lever independent of any of the control levers of the machine. The bracket 2 carrying the rotatable shaft 16 is fastened to the rear of the vehicle at a point in advance of the tail lamp 1, as clearly illustrated in Figs. 1 and 2 of the drawings, while the shaft has rigidly secured thereto a signal blade or plate 24 equipped in the present instance with a colored lens or bull's eye 25.

The operation of this form of my invention may be briefly stated as follows: The spring 17 normally holds the shaft 16 in such position that the signal blade is out of the path of the light rays of the lamp 1 and at right angles to such path. Should the operator of the machine desire to communicate the signal to an operator of a machine in the rear he pulls upon the cord or cable 23 and through the arm 18 transmits a rotary movement to the shaft 16 with the effect to move the latter against the action of the spring 17 and so throw the signal blade 24 into a plane coincident to that of the light rays issuing from the lamp 1, thereby enabling the colored lens 25 of the signal blade to be clearly discerned. Should the cord 23 be connected to one of the control levers of the machine, such, for instance, as the clutch lever, it will be seen that the signal blade will be operated whenever the engine is disconnected from the drive wheels. The toothed lugs 5 and 6 and the similar lugs 9 and 10 constitute in effect a universal joint whereby the position of the signal blade may be changed or varied in accordance with the circumstances or requirements of each particular case, while the sleeve 11 and the rod 13 form an adjustable connection by means of which the signal blade may be moved toward and from the path of the light rays.

While I have herein shown and described certain preferred forms of my invention by way of illustration, I desire to have it understood that I do not limit or confine myself to the precise details of construction herein described and delineated, as modification and variation may be made within the scope of the claim and without departing from the spirit of the invention.

I claim:—

In combination with a vehicle tail lamp having a convex lens, a signal blade normally positioned at right angles to the rays of light emerging from the lamp and adapted to be moved to an angle of 45% so as to project the rays impinging thereon rearwardly of the vehicle, a shaft formed on the blade, a bearing for said shaft, a rod formed integral therewith, a signal support, a sleeve adjustably mounted to move in an arc of a circle on said support and adapted to receive the said rod, and a set screw carried by the said sleeve adapted to allow longitudinal adjustment of the said shaft for positioning the signal blade in the rays of greatest intensity emerging from the tail lamp.

In testimony whereof I affix my signature in presence of two witnesses.

CHARLES W. WALLER.

Witnesses:
JOHN CURRY,
GEORGE H. FIELD.

Copies of this patent may be obtained for five cents each, by addressing the "Commissioner of Patents, Washington, D. C."